United States Patent
Kim et al.

(10) Patent No.: US 9,069,113 B2
(45) Date of Patent: Jun. 30, 2015

(54) DISPLAY DEVICE

(71) Applicant: Samsung Display Co., Ltd., Yongin, Gyeonggi-Do (KR)

(72) Inventors: JooYoung Kim, Suwon-si (KR); TaekYoung Hwang, Hwaseong-si (KR); Changmoo Lee, Yongin-si (KR); Sangho Hwang, Suwon-si (KR); Insun Hwang, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 58 days.

(21) Appl. No.: 14/066,250

(22) Filed: Oct. 29, 2013

(65) Prior Publication Data

US 2014/0307474 A1    Oct. 16, 2014

(30) Foreign Application Priority Data

Apr. 11, 2013    (KR) .................. 10-2013-0039945

(51) Int. Cl.
*F21V 15/01*    (2006.01)
*F21V 8/00*    (2006.01)

(52) U.S. Cl.
CPC .............. *G02B 6/0093* (2013.01); *F21V 15/01* (2013.01); *G02B 6/0091* (2013.01)

(58) Field of Classification Search
CPC ..... G02B 6/0093; G02B 6/0091; F21V 15/01
USPC ...................... 362/632; 349/58, 60
See application file for complete search history.

(56) References Cited

U.S. PATENT DOCUMENTS

| | | |
|---|---|---|
| 6,753,843 B2 | 6/2004 | Wang |
| 7,154,570 B2 | 12/2006 | Lee |
| 7,190,503 B2 * | 3/2007 | Ide ................................ 359/245 |
| 7,847,912 B2 | 12/2010 | Nishzawa et al. |
| 7,920,223 B2 | 4/2011 | Nishzawa et al. |
| 8,111,347 B2 * | 2/2012 | Koganezawa .................... 349/58 |
| 2007/0146569 A1 * | 6/2007 | Nouchi et al. .................. 349/58 |
| 2011/0096262 A1 * | 4/2011 | Kikuchi .......................... 349/58 |
| 2012/0020056 A1 * | 1/2012 | Yamagata et al. ........... 362/97.1 |
| 2012/0092813 A1 | 4/2012 | Kao et al. |

FOREIGN PATENT DOCUMENTS

| | | |
|---|---|---|
| EP | 2204688 A1 | 7/2010 |
| JP | 2006-216244 | 8/2006 |
| JP | 2007-322541 | 12/2007 |
| JP | 2010-051348 | 3/2010 |
| KR | 10-2004-0056744 A | 7/2004 |
| KR | 10-2004-0057270 A | 7/2004 |
| KR | 10-2005-0050701 A | 6/2005 |
| KR | 10-2006-0038551 A | 5/2006 |
| KR | 10-2007-0079227 A | 8/2007 |
| KR | 10-2007-0115214 A | 12/2007 |
| KR | 10-2007-0122333 A | 12/2007 |
| KR | 10-2009-0090813 A | 8/2009 |

* cited by examiner

*Primary Examiner* — Anne Hines
(74) *Attorney, Agent, or Firm* — Innovation Counsel LLP

(57) ABSTRACT

A display device includes a display panel, a protective member, a light guide member, a light source, and a light leakage preventing member. The display device includes a display surface concavely curved in a first direction. The light leakage preventing member is coupled to the protective member to be movable according to expansion or contraction of the light guide member. The light leakage preventing member contracts and expands according to the expansion or contraction of the light guide member, and includes an elastic part to prevent the light source from being damaged by the expansion of the light guide member.

18 Claims, 16 Drawing Sheets

DISPLAY DEVICE

CROSS-REFERENCE TO RELATED APPLICATION

This U.S. non-provisional patent application claims priority under 35 U.S.C. §119 of Korean Patent Application No. 10-2013-0039945, filed on Apr. 11, 2013, the contents of which are hereby incorporated by reference in their entirety.

BACKGROUND

1. Field of Disclosure

The present disclosure relates to a display device. More particularly, the present disclosure relates to a curved-surface type display device.

2. Description of the Related Art

Flat-surface type display devices have been developed to replace cathode ray tube display devices, which have a relatively large size and high power consumption. Various types of flat-surface display devices, such as organic light emitting display devices, liquid crystal display devices, plasma display panel, etc., have been developed.

In recent years, demand has increased for display devices that can provide the viewer with a three-dimensional effect and also with a sense of immersion and presence within the displayed image. To provide the viewer with a three-dimensional effect, three-dimensional image display devices are being developed, and, to provide the viewer with the sense of immersion and presence in the display image, curved-surface type display devices are being developed.

SUMMARY

The present disclosure provides a curved-surface type display device capable of improving durability and display quality.

A display device includes a display panel, a protective member, a first light guide member, a first light source, and a first light leakage preventing member. The protective member includes an upper protective member, an intermediate protective member, and a lower protective member. The display panel includes a display surface concavely curved in a first direction.

The upper protective member accommodates the display panel, partially covers the display panel, and includes an opening portion to partially expose the display surface.

The first light guide member is disposed under the display panel and includes a first incident surface. The first light guide member guides light incident to the first incident surface to the display panel. The intermediate protective member supports the display panel and includes a contact surface facing the first incident surface.

The first light source generates the light incident to the first incident surface and has a portion disposed between the contact surface and the first incident surface. The first light leakage preventing member is coupled to the lower protective member to be movable in a second direction substantially perpendicular to the first direction according to expansion and contraction of the first light guide member. A first portion of the first light leakage preventing member is disposed between the contact surface and the portion of the first light source, and includes an elastic part protruded from the first light leakage preventing member to the contact surface.

The first light leakage preventing member includes the first portion, a first horizontal portion, and a second horizontal portion. The first horizontal portion is bent from one end of the first portion and coupled to the lower protective member. The second horizontal portion is bent from the other end of the first portion and overlapped with the first light guide member.

The lower protective member includes a first coupling hole positioned to overlap with the first horizontal portion. The first horizontal portion includes a second coupling hole overlapped with the first coupling hole.

The display device further includes a coupling member inserted into the first and second coupling holes to restrict a movement of the first light leakage preventing member to a third direction of a surface defined by the first direction and the second direction.

The display device further includes at least one second light guide member, a second light source, and a second light leakage preventing member. The second light guide member is disposed between the first light guide member and the lower protective member. The second light guide member includes a second incident surface and guides the light incident to the second incident surface to the first light guide member.

The second light source generates the light incident to the second incident surface and has a portion disposed between the contact surface and the second incident surface. The second light leakage preventing member supports the first light guide member and the first light source and having a portion disposed between the contact surface and the first portion.

The second light guide member includes an upper light guide member and a lower light guide member spaced apart from the upper light guide member in the second direction. The second light source includes an upper light source to generate the light incident to the second incident surface of the upper light guide member and a lower light source to generate the light incident to the second incident surface of the lower light guide member.

According to the above, when the first light guide member is expanded by the incident light, the elastic part is contracted to correspond to an expansion rate of the first light guide member. The lateral pressure applied to the first light source from the first light guide member is absorbed by the elastic part. Thus, the first light source may be prevented from being damaged and the first light guide member may be prevented from being bent.

When the first light guide member is contracted, the elastic part is expanded to return to its original position, and thus the first light source is adhered to the first incident surface. Due to the movement of the elastic part, a distance between the first light source and the first incident surface is uniformly maintained. In this case, a uniform amount of light is supplied to the first incident surface, and thus the display panel displays the image having uniform brightness.

The movement of the first light leakage preventing member in the thickness direction of the display device is restricted by the coupling member, so that the first light leakage preventing member may be prevented from being separated.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
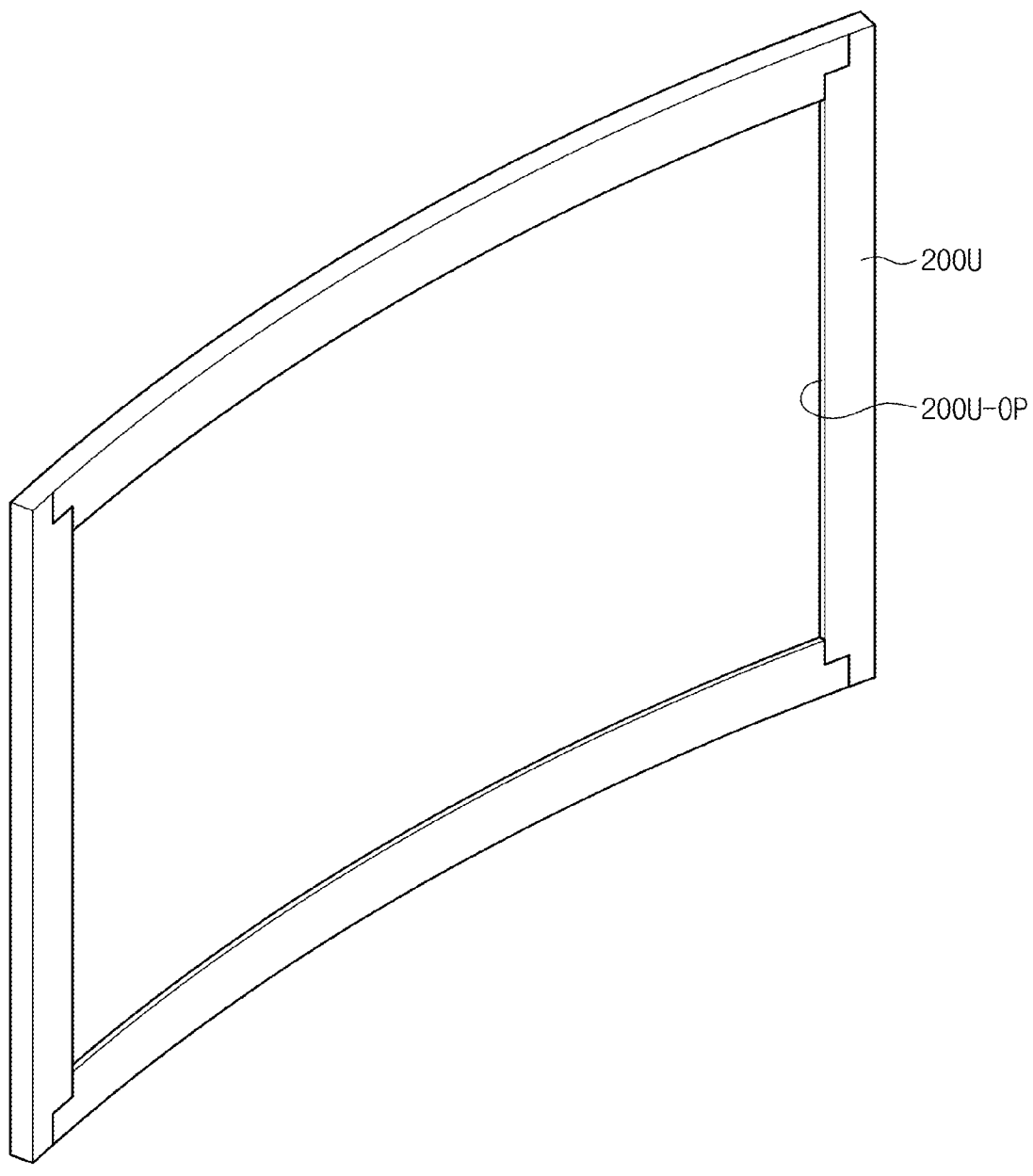
FIG. 1 is a perspective view showing a display device according to an example embodiment of the present disclosure.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath" "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation of the device. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
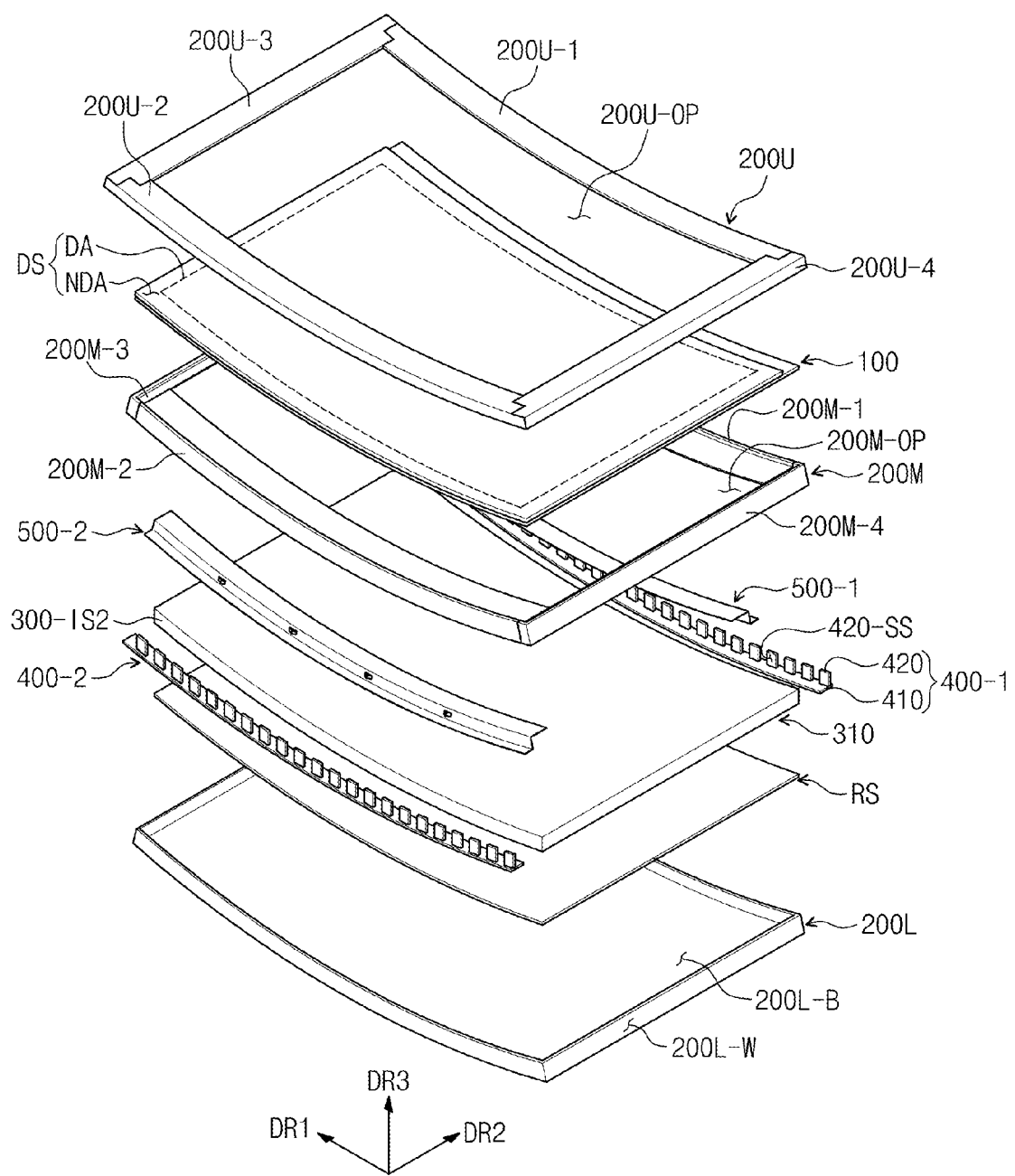
FIG. 2 is an exploded perspective view showing the display device shown in FIG. 1.

FIG. 1 is a perspective view showing a display device according to an example embodiment of the present disclosure and FIG. 2 is an exploded perspective view showing the display device shown in FIG. 1.

Referring to FIGS. 1 and 2, the display device includes a display panel 100, protective members 200U, 200M, and 200L, a light guide member 300, light sources 400-1 and 400-2, and light leakage preventing members (hereinafter, referred to as preventing members) 500-1 and 500-2. In addition, the display device includes one or more optical sheets disposed on the light guide member 300. For example, as shown in FIG. 2, the display device may further include a reflective sheet RS disposed under the light guide member 300. Further, the display device may include at least one of a prism sheet or a diffusion sheet (not shown in the figures) disposed between the display panel 100 and the light guide plate 300.

The display panel 100 receives light from the light guide member 300 and generates an image. For instance, the display panel 100 may be a transmission or reflection type display panel, e.g., a liquid crystal display panel, an electrophoretic display panel, etc.

The display panel 100 has a rectangular shape when viewed in a plan view. Hereinafter, a longitudinal direction of the display panel 100 is referred to as a first direction DR1 and a width direction of the display panel 100 is referred to as a second direction DR2. In addition, a thickness direction of the display panel 100 is referred to as a third direction DR3.

The display panel 100 is curved in the first direction DR1 to be slightly concave along the first direction DR1. The display panel 100 provides a display surface DS that is concavely curved. The display surface DS includes a display area DA in which a still image or a moving image is displayed, and a non-display area NDA disposed adjacent to the display area DA when viewed in a plan view. Pixels which display the image are arranged in the display area DA, and pads of lines connected to the pixels and which provide signals to the pixels may be arranged in the non-display area NDA. The protective members 200U, 200M, and 200L, the light guide member 300, the light sources 400-1 and 400-2, and the preventing members 500-1 and 500-2 are concavely curved along the first direction DR1 to have the same curvature as that of the display panel 100.

The protective members 200U, 200M, and 200L include an upper protective member 200U, a lower protective member 200L coupled to the upper protective member 200U, and an intermediate protective member 200M disposed between the upper protective member 200U and the lower protective member 200L. The upper protective member 200U and the lower protective member 200L accommodate different components of the display device and protect the accommodated components.

Each of the upper protective member 200U, the intermediate protective member 200M, and the lower protective member 200L may include a number of independent parts which are assembled to form the protective members 200U, 200M, and 200L. The material used to form the protective members 200U, 200M, and 200L may include, for example, plastic, aluminum, and/or stainless steel.

The upper protective member 200U is disposed on the display panel 100. The upper protective member 200U is provided with an opening portion 200U-OP formed therethrough to expose the display area DA of the display surface DS. The upper protective member 200U covers the non-display area NDA. The upper protective member 200U may include four parts, 200U-1 to 200U-4, which are independent and are assembled to each other, that is, each of the four upper protective member parts 200U-1 to 200U-4 may be separately formed, and then assembled together to form the upper protective member 200U.

The lower protective member 200L accommodates the display panel 100. The lower protective member 200L includes a bottom portion 200L-B and a sidewall portion 200L-W upwardly bent from the bottom portion 200L-B. The bottom portion 200L-B has a rectangular shape when viewed in a plan view. The sidewall portion 200L-W is bent to the third direction DR3 from four sides of the bottom portion 200L-B. A portion of the sidewall portion 200L-W may be omitted.

The intermediate protective member 200M supports the non-display area NDA of the display panel 100. In addition, the intermediate protective member 200M may be a rectangular frame. The opening portion 200M-OP is placed inside the intermediate protective member 200M.

The intermediate protective member 200M may include four parts, 200M-1 to 200M-4, which are independent and are assembled to each other, that is, each of the four intermediate protective member parts 200U-1 to 200U-4 may be separately formed and then assembled together to form the upper protective member 200U. The four parts 200M-1 to 200M-4 include first and second parts 200M-1 and 200M-2 extended in the first direction DR1 and arranged so as to be spaced apart from each other in the second direction DR2, and third and fourth parts 200M-3 and 200M-4 extended in the second direction DR2. The third and fourth parts 200M-3 and 200M-4 are each connected, at their ends, to an end of the first parts 200M-1 and an end of a second part 200M-2.

The light guide member 300 is disposed under the display panel 100 and overlapped with at least the display area DA. The light guide member 300 may be a rectangular plate including a plurality of side surfaces. The side surfaces include incident surfaces 300-IS1 and 300-IS2 extended in the first direction DR1. The incident surfaces 300-IS1 and 300-IS2 include an upper incident surface 300-IS1 and a lower incident surface 300-IS2 arranged so as to be spaced apart from each other in the second direction DR2. In FIG. 2, only incident surface 300-IS2 is labeled, incident surface 300-IS1 is opposite 300-IS2 next to light source 400-1, and cannot be seen in the perspective illustrated in FIG. 2.

Each of the light sources 400-1 and 400-2 includes a circuit board 410 and a plurality of light emitting devices 420 mounted on the circuit board 410. The light sources 400-1 and 400-2 include an upper light source 400-1 to supply the light to the upper incident surface 300-IS1, and a lower light source 400-2 to supply the light to the lower incident surface 300-IS2. Either of the upper light source 400-1 and the lower light source 400-2 may be omitted.

The circuit board 410 is extended in the first direction DR1. The circuit board 410 includes at least one insulating layer (not shown) and at least one circuit layer (not shown).

Each light emitting device 420 may be, but is not limited to, a light emitting diode. The light emitting diode receives a dimming signal and a driving voltage from the circuit layer disposed on the circuit substrate 410. The light emitting devices 420 are successively arranged in the first direction DR1, and are spaced apart from each other at regular intervals. Exit surfaces 420-SS of the light emitting devices 420 are vertical (approximately perpendicular) to the upper surface of the circuit board 410. Each exit surface 420-SS faces the incident surfaces 300-IS1 and 300-IS2.

The preventing members 500-1 and 500-2 protect the light emitting devices 420 and block the light generated by the light emitting devices 420 from leaking into the display device outside of the light guide plate 300. The preventing members 500-1 and 500-2 include an upper light leakage preventing member (hereinafter, referred to as upper preventing member) 500-1 to prevent the light generated by the upper light source 400-1 from being leaked, and a lower light leakage preventing member (hereinafter, referred to as lower preventing member) 500-2 to prevent the light generated by the lower light source 400-2 from being leaked.

The preventing members 500-1 and 500-2 are coupled to the lower protective member 200L so as to be movable along the second direction DR2 in such a way that accommodates the expansion and contraction of the light guide member 300. The coupling relation between the preventing members 500-1 and 500-2 and the lower protective member 200L will be described in detail later.

Figure 3:
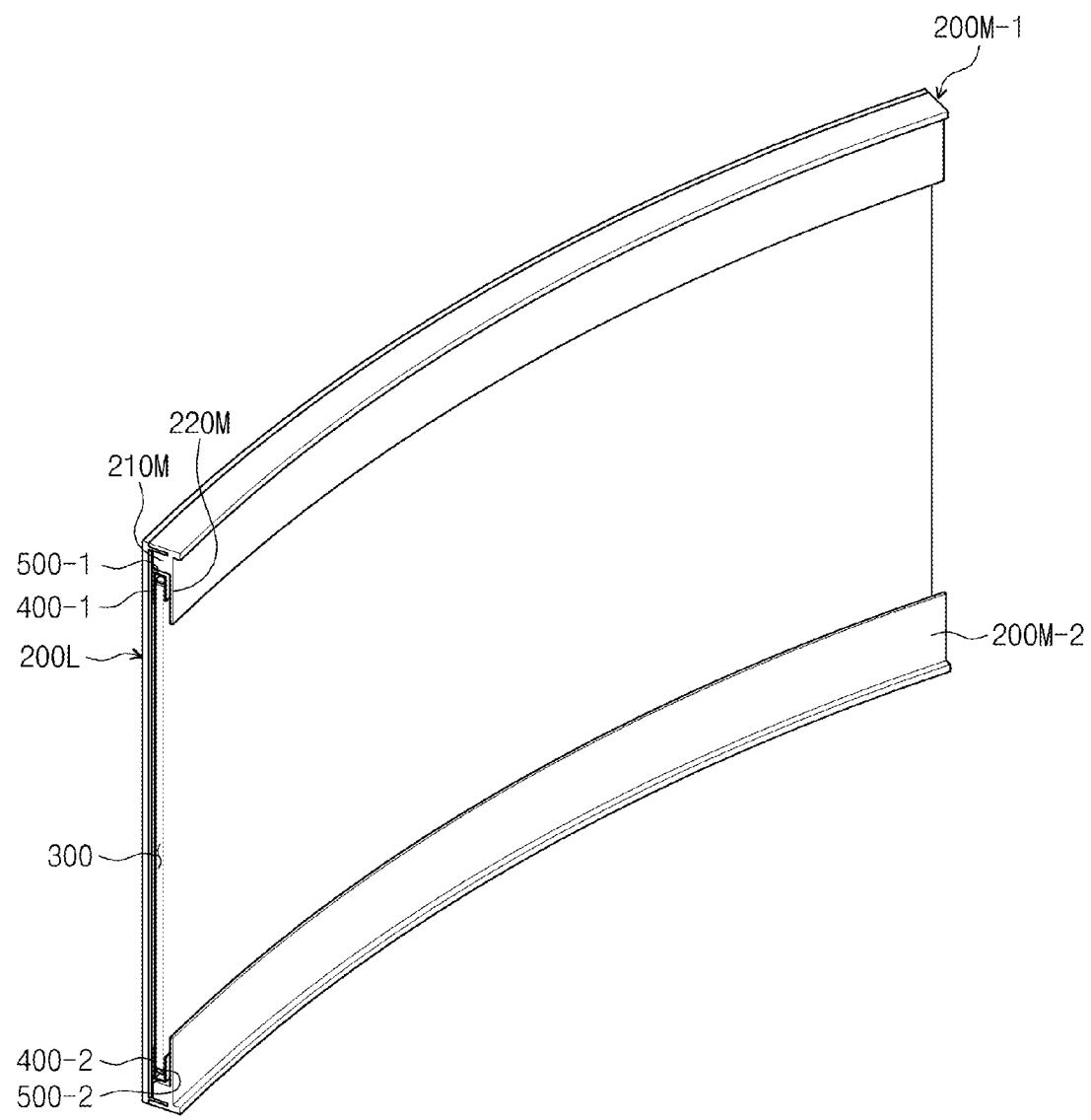
FIGS. 3 and 4 are perspective views showing the display device after removing a part of the display device.
Figure 4:
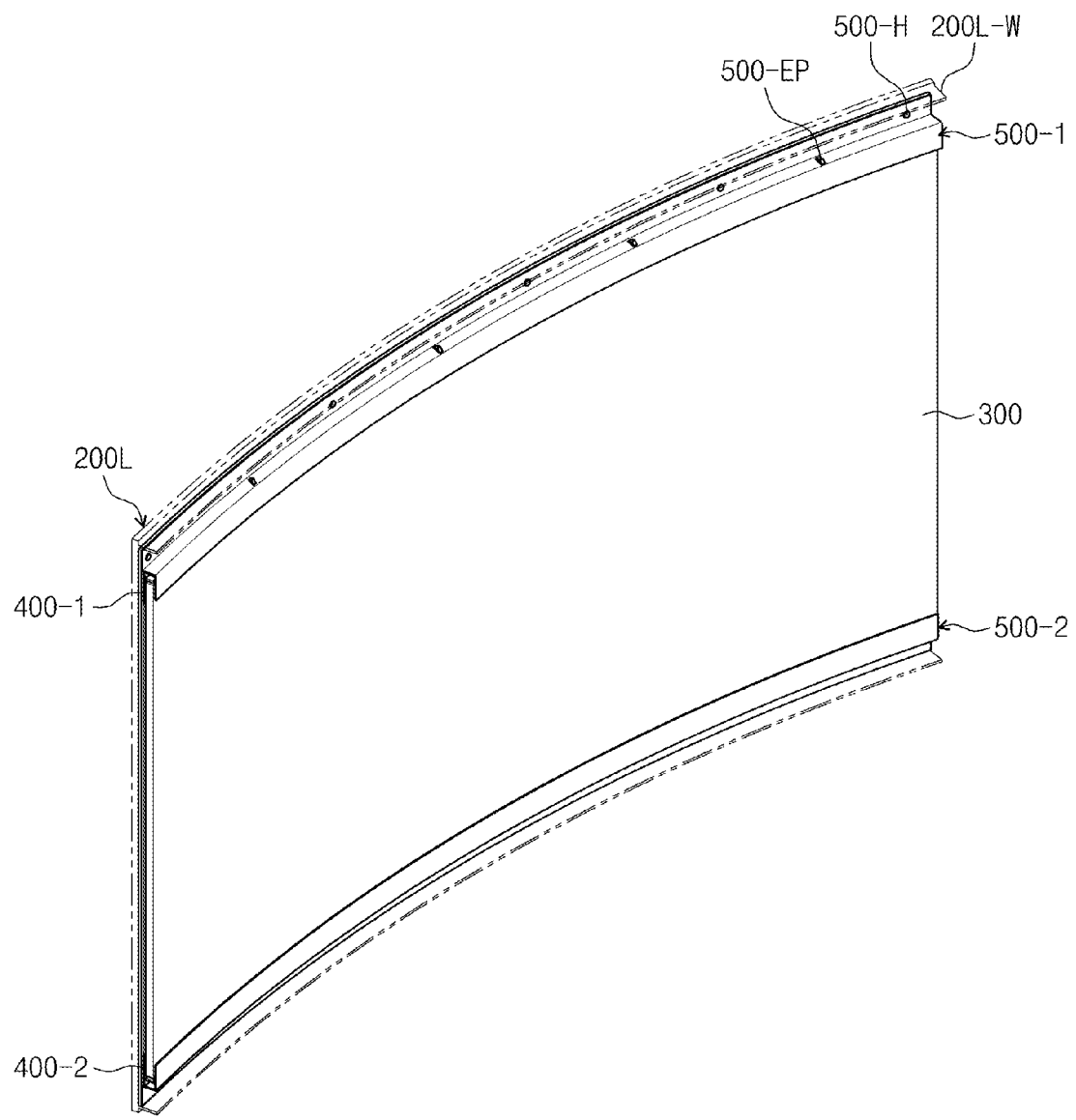

FIGS. 3 and 4 are perspective views showing a portion of the display device. FIG. 3 shows the display device from which the upper protective member 200U and the display panel 100 are omitted, and FIG. 4 shows the display device from which the upper protective member 200U, the display panel 100, and the intermediate protective member 200M are omitted.

Referring to FIGS. 3 and 4, each of the first part 200M-1 and the second part 200M-2 includes a body portion 210M coupled to the lower protective member 200L, and a support portion 220M connected to the body portion 210M to support the display panel 100. The first part 200M-1 is disposed to overlap with the upper preventing member 500-1, and the second part 200M-2 is disposed to overlap with the lower preventing member 500-2.

The upper preventing member 500-1 and the lower preventing member 500-2 are extended in the first direction DR1. Each of the upper and lower preventing members 500-1 and 500-2 includes at least one elastic part 500-EP that protrudes toward the body portion 210M of each of the first and second parts 200M-1 and 200M-2. The upper and lower preventing members may include multiple elastic parts 500-EP, and the elastic parts 500-EP may be arranged in the first direction DR1 at regular intervals.

Each of the upper preventing member 500-1 and the lower preventing member 500-2 includes a coupling hole (hereinafter, referred to as first coupling hole) 500-H. Multiple first coupling holes 500-H may be provided. The first coupling holes 500-H are arranged in the first direction DR1 at regular intervals. In FIG. 4, the first coupling holes 500-H of the lower preventing member 500-2 have not been shown. The upper preventing member 500-1 and the lower preventing member 500-2 are coupled to the lower protective member 200L through the first coupling holes 500-H.

Figure 5:
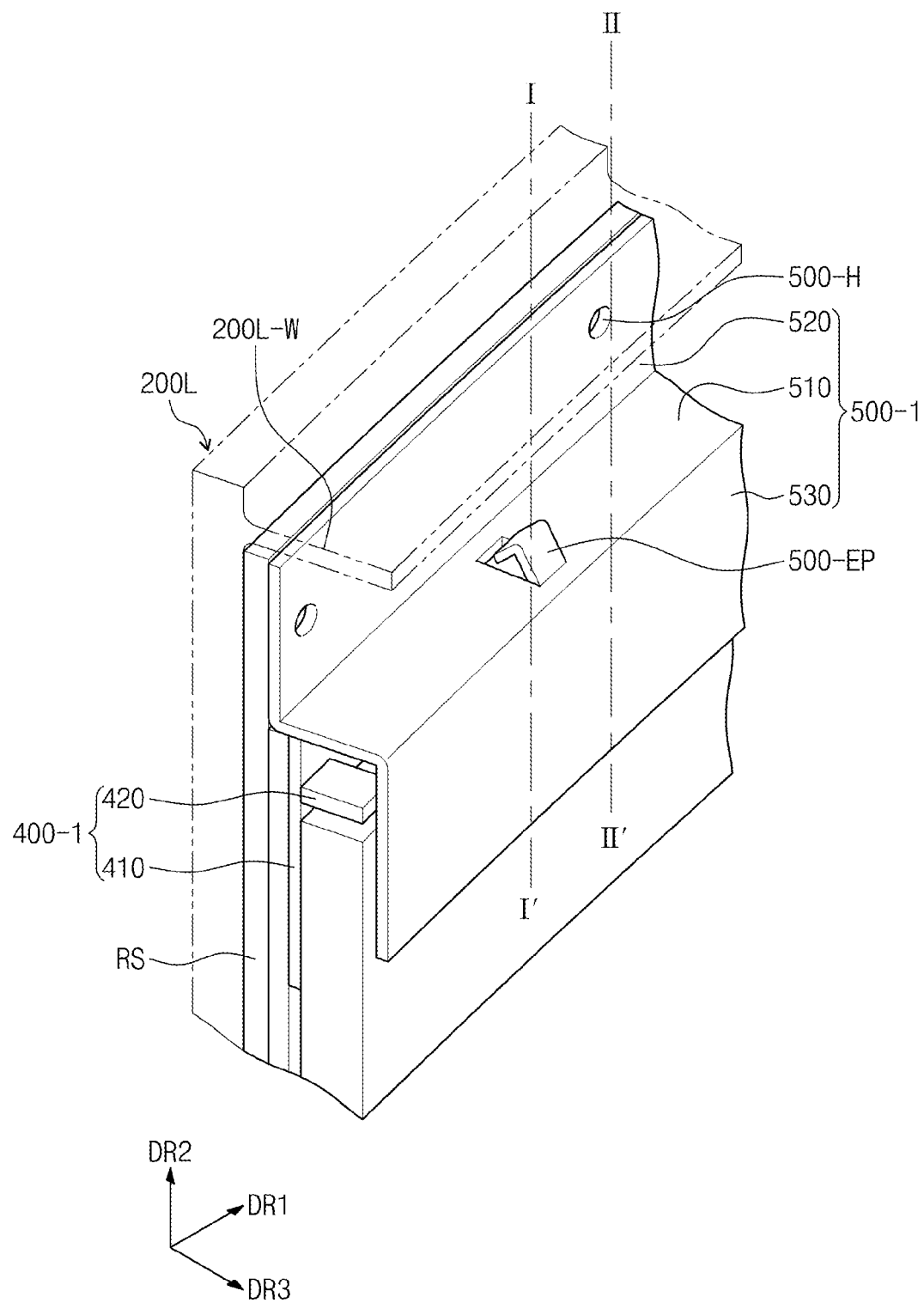
FIG. 5 is a partially enlarged view showing a portion of the display device shown in FIG. 4.
Figure 6:
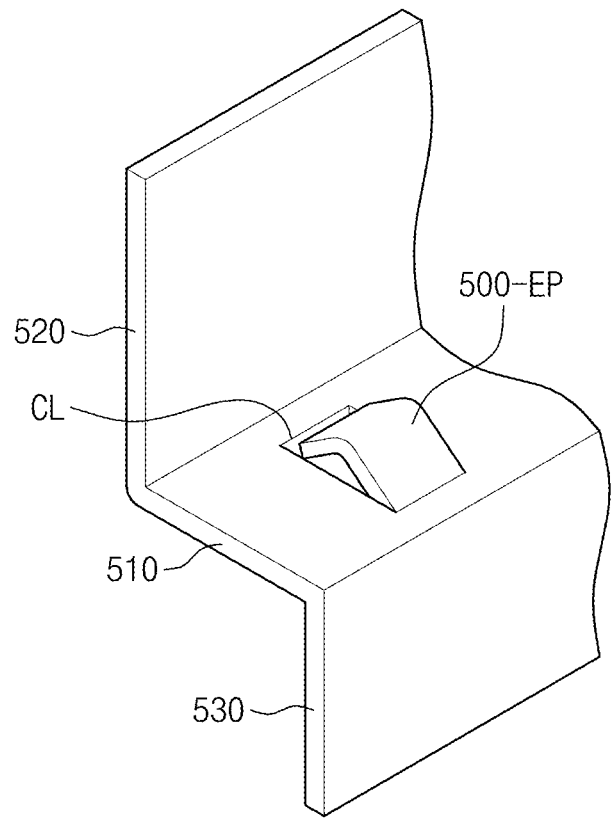
FIG. 6 is a partially enlarged view showing an elastic part shown in FIG. 5.

FIG. 5 is a partially enlarged view showing a portion of the display device shown in FIG. 4 and FIG. 6 is a partially enlarged view showing an elastic part shown in FIG. 5.

Referring to FIG. 5, the upper preventing member 500-1 includes a vertical portion 510, a first horizontal portion 520 bent from one end of the vertical portion 510, and a second horizontal portion 530 bent from the other end of the vertical portion 510. vertical portion The first horizontal portion 520 is coupled to the lower protective member 200L and the second horizontal portion 530 is overlapped with the light guide member 300. The vertical portion 510 includes the elastic part 500-EP and the first horizontal portion 520 includes the first coupling hole 500-H.

Figure 7:
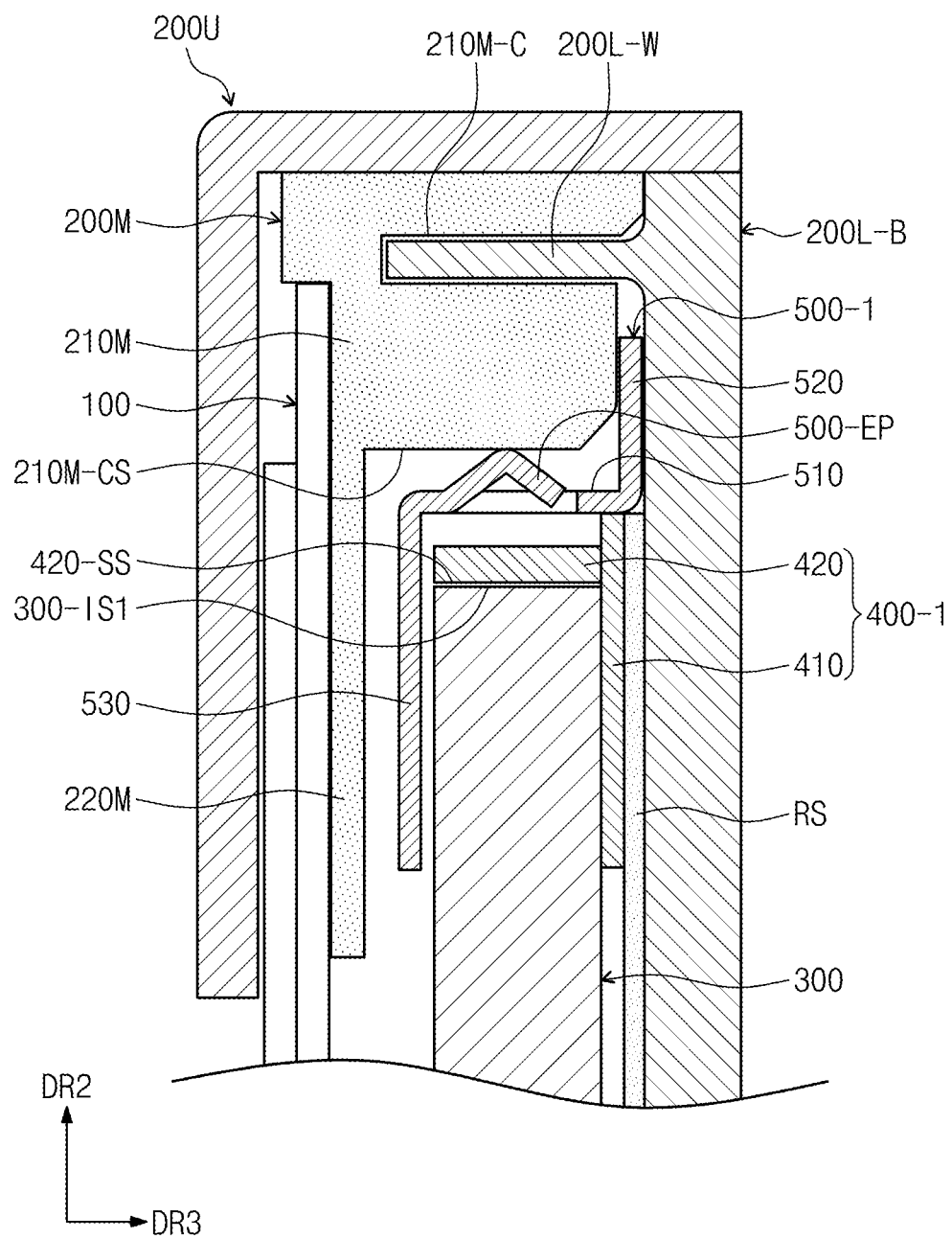
FIG. 7 is a cross-sectional view taken along a line I-I' of FIG. 5.

Referring to FIG. 6, the elastic part 500-EP serves as a portion of the vertical portion 510. The elastic part 500-EP is formed by partially cutting a portion of the vertical portion 510, for example by cutting along cutting line CL. The elastic portion 500-EP is obtained by protruding the cut portion toward the body portion 210M. The elastic part 500-EP is bent at a center portion of the protruded portion, but the shape of the elastic part 500-EP should not be limited thereto or thereby. That is, the elastic part 500-EP may be formed by attaching a separate elastic member, which may be, for example, a member that protrudes from the preventing member 500-1, 500-2 and is formed of a material having higher elasticity than the preventing member 500-1, 500-2 and/or the body portion 210, to the vertical portion 510 without cutting the portion of the vertical portion 510. FIG. 7 is a cross-sectional view taken along a line of FIG. 5 and FIGS. 8A and 8B are cross-sectional views showing a movement of the elastic part according to expansion and contraction of a light guide member.

Figure 8A:
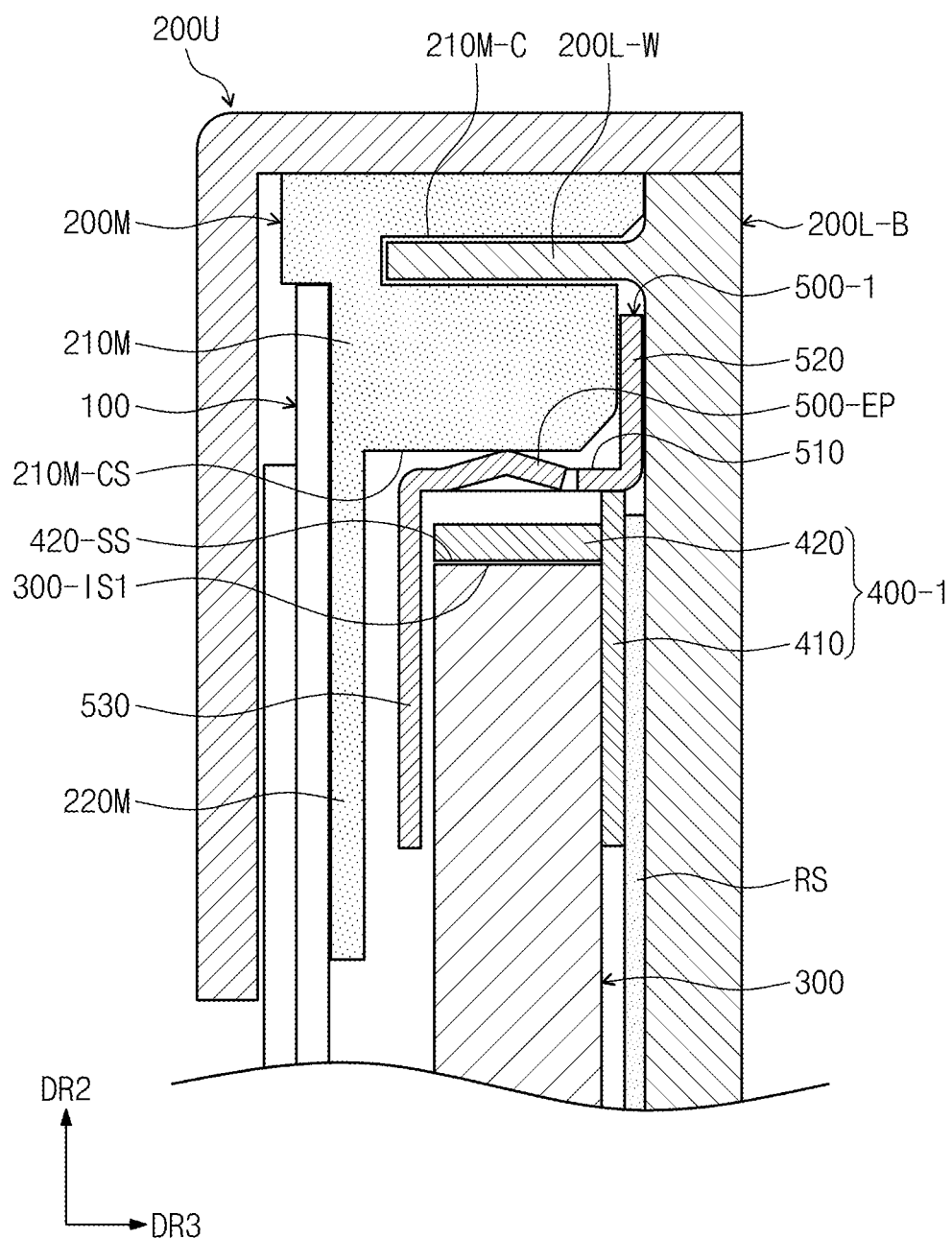
FIGS. 8A and 8B are cross-sectional views showing a movement of the elastic part according to expansion and contraction of a light guide member.
Figure 8B:
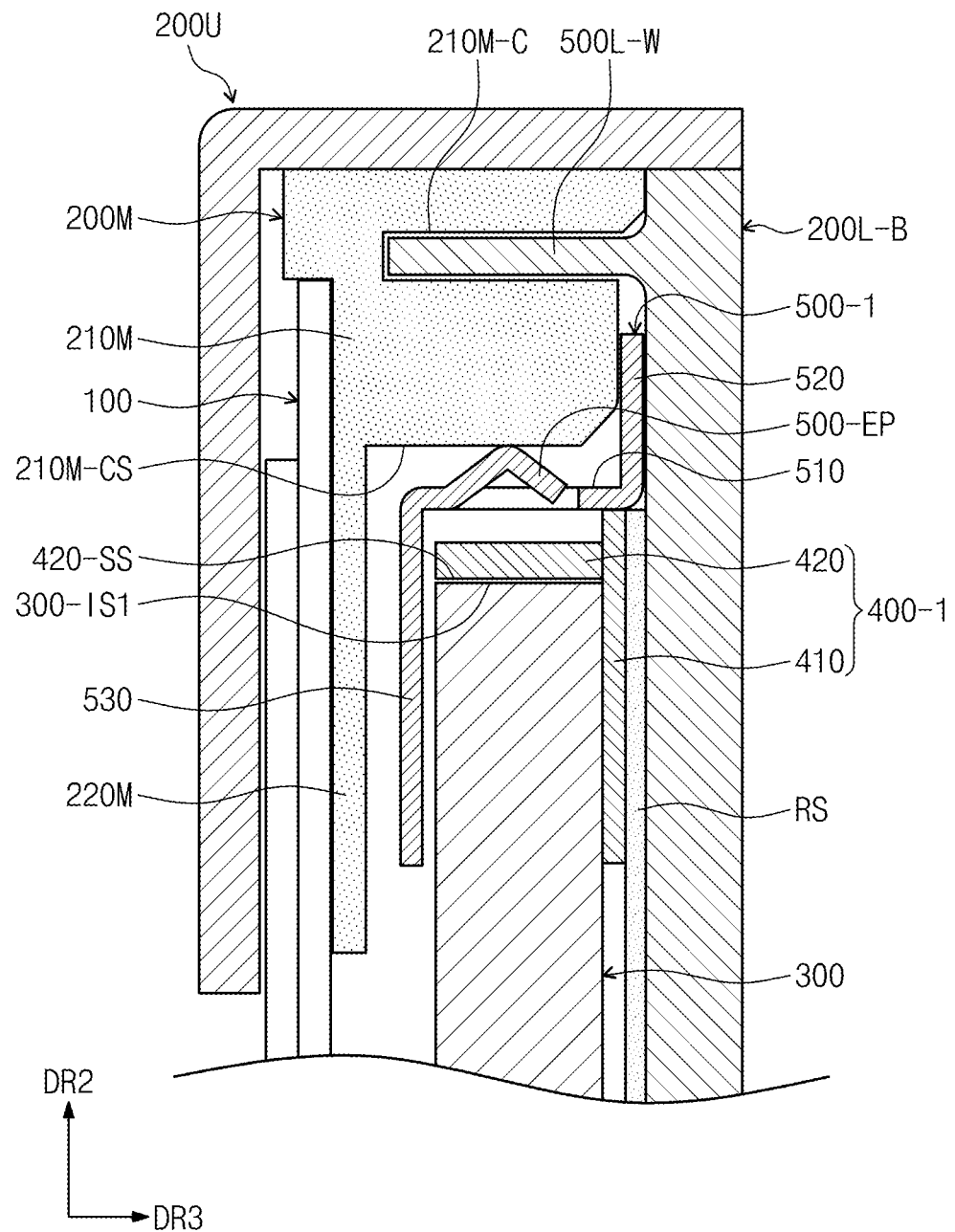

FIGS. 7, 8A, and 8B show the display device shown in FIG. 5 after the display panel 100, the upper protective member 200U, and the intermediate protective member 200M are further coupled. Hereinafter, function, structure, and relation of the upper preventing member 500-1 and the parts adjacent to the upper preventing member 500-1 will be described in detail. The following descriptions may be applied to the lower preventing member 500-2 and the parts adjacent to the lower preventing member 500-2.

Referring to FIG. 7, the reflective sheet RS is disposed on the bottom portion 200L-B of the lower protective member 200L. The circuit board 410 is disposed on the reflective sheet RS. In addition, the light guide member 300 is disposed in a position so as to overlap with the reflective sheet RS and the circuit board 410. The exit surface 420-SS of the light emitting device 420 faces the upper incident surface 300-IS1 of the light guide member 300. The exit surface 420-SS is adhered to the upper incident surface 300-IS1.

The upper preventing member 500-1 is disposed on the lower protective member 200L. The vertical portion 510 faces the upper incident surface 300-IS1. The light emitting device 420 is disposed between the vertical portion 510 and the upper incident surface 300-IS1. The first horizontal portion 520 makes contact with the lower protective member 200L and the second horizontal portion 530 is overlapped with the light emitting device 420 and along an edge of the light guide member 300.

The body portion 210M of the intermediate protective member 200M includes a contact surface 210M-CS facing the upper incident surface 300-IS1 of the light guide member 300. The vertical portion 510 is disposed between the upper incident surface 300-IS1 and the contact surface 210M-CS. The elastic part 500-EP provided with the vertical portion 510 protrudes toward the contact surface 210M-CS.

The intermediate protective member 200M is coupled to the sidewall portion 200L-W of the lower protective member 200L. The body portion 210M of the intermediate protective member 200M includes a coupling recess 210M-C disposed in a position corresponding to a position of the sidewall portion 200L-W of the lower protective member 200L. The sidewall portion 200L-W is inserted into the coupling recess 210M-C.

Referring to FIG. 8A, when light is incident to the upper incident surface 300-IS1 from the light emitting device 420, the light guide member 300 may expand. The expanded light guide member 300 applies a lateral pressure to the light emitting device 420. Due to the lateral pressure, the circuit board 410 on which the light emitting device 420 is mounted pushes against the vertical portion 510. In this case, the lateral pressure is absorbed by the elastic part 500-EP because the elastic part 500-EP is contracted to correspond to an expansion rate of the light guide member 300. As described above, when the elastic part 500-EP absorbs the pressure exerted on the upper light source 400-1 from the expanded light guide plate 300, damage to the upper light source 400-1 may be prevented, and the light guide member 300 may be prevented from being bent.

Referring to FIG. 8B, when the light emitting device 420 is turned off or an amount of the light provided from the light emitting device 420 is reduced, the light guide member 300 may contract. The elastic part 500-EP returns to its original position, and thus the light emitting device 420 remains adhered to the upper incident surface 300-IS1 when the light guide member 300 expands and contracts. Due to the movement of the elastic part 500-EP, a distance between the light emitting device 420 and the upper incident surface 300-IS1 is uniformly maintained.

Figure 9:
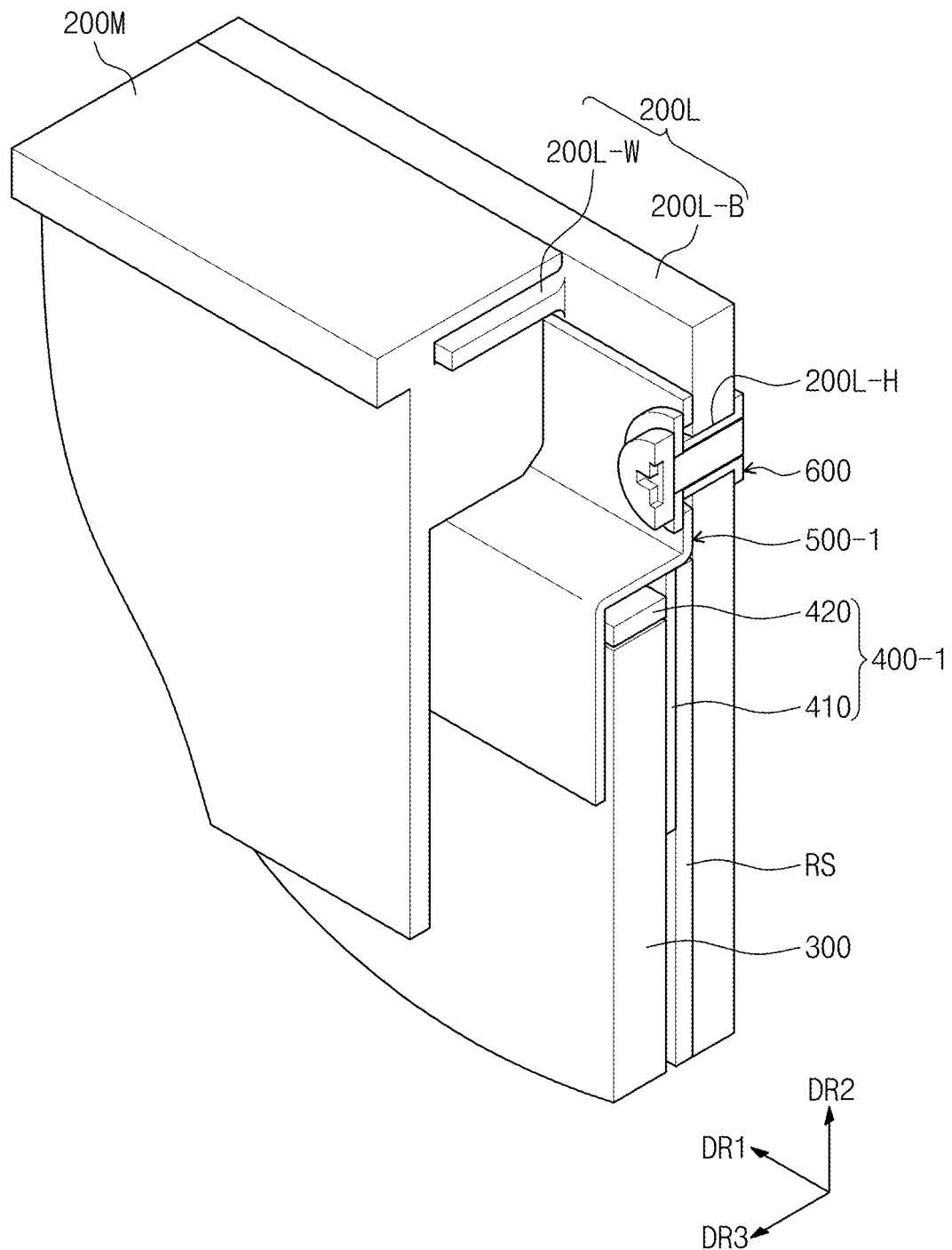
FIG. 9 is a cross-sectional view taken along a line II-II' of FIG. 5.
Figure 10A:
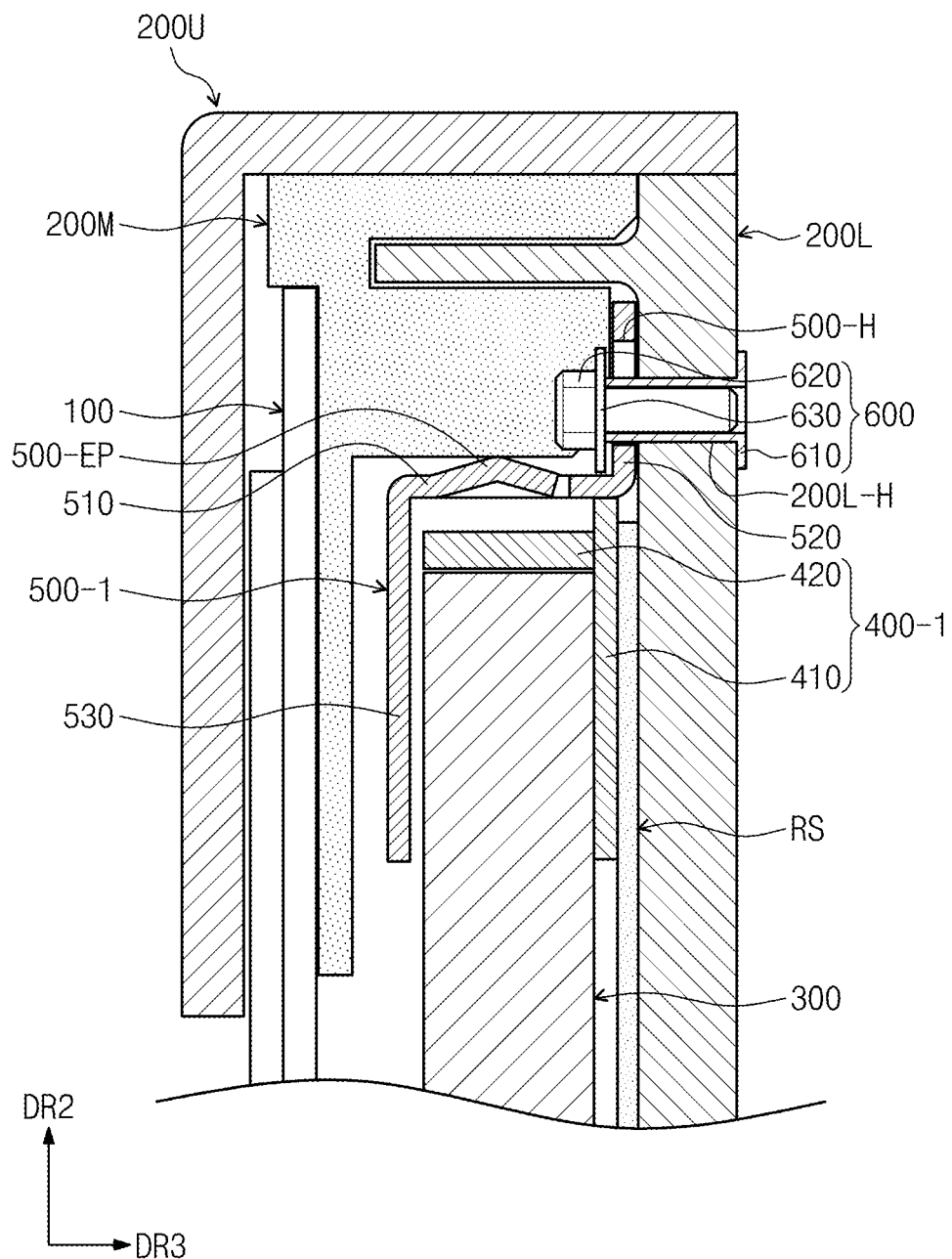
FIGS. 10A and 10B are cross-sectional views showing a position of a light leakage preventing member according to expansion and contraction of a light guide member.
Figure 10B:
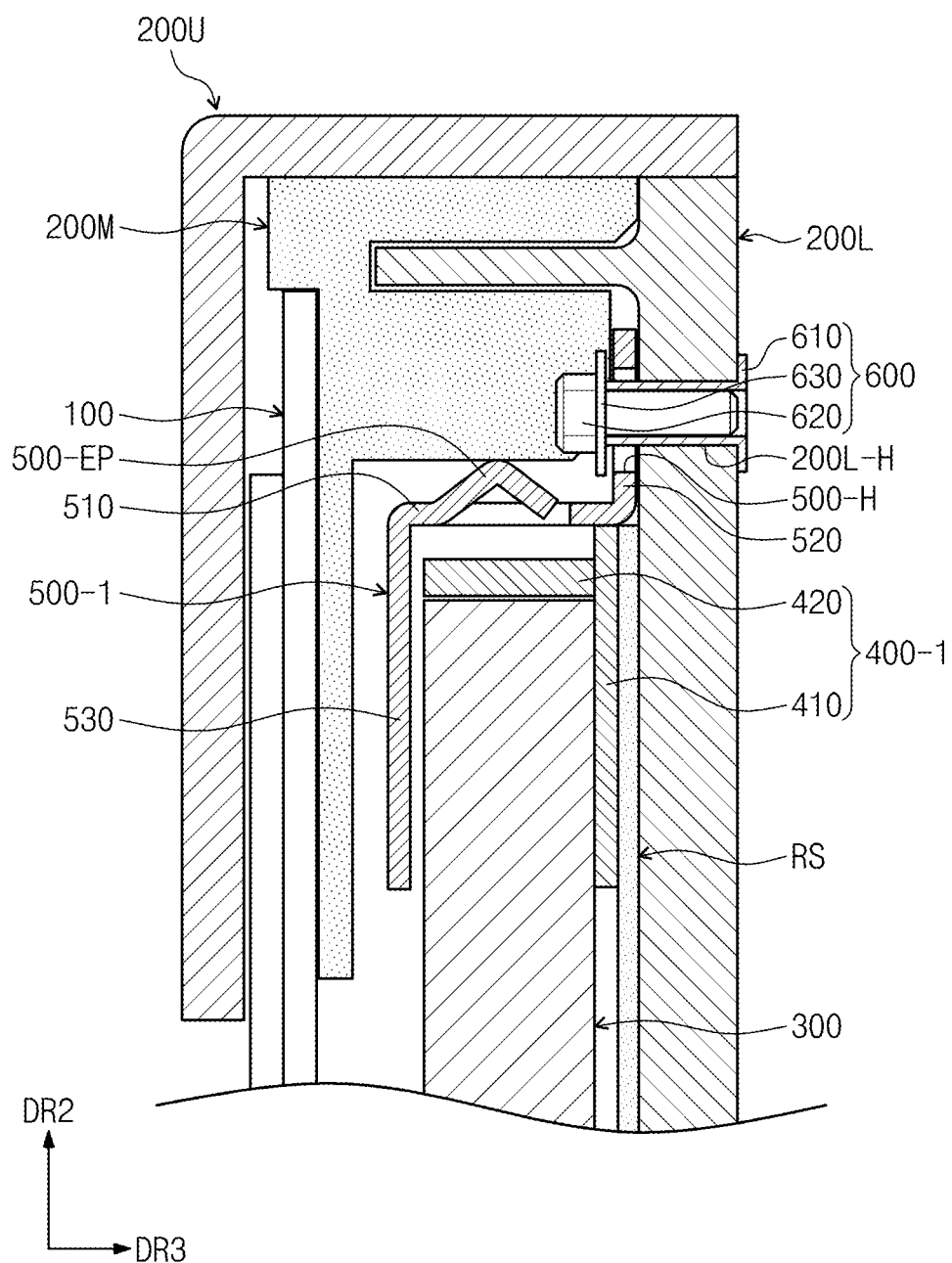

FIG. 9 is a cross-sectional view taken along a line II-II' of FIG. 5 and FIGS. 10A and 10B are cross-sectional views showing a position of the light leakage preventing member according to expansion and contraction of the light guide member.

The lower protective member 200L includes a coupling hole (hereinafter, referred to as second coupling hole) 200L-H provided in an area that overlaps with the first horizontal portion 520. Multiple second coupling holes 200L-H may be provided, and the second coupling holes 200L-H are consecutively arranged in the first direction DR1 and spaced apart from each other at regular intervals. The second coupling hole 200L-H is overlapped with the first coupling hole 500-H of the first horizontal portion 520.

The first horizontal portion 520 is coupled to the lower protective member 200L by a coupling member 600 inserted into the first coupling hole 500-H and the second coupling hole 200L-H. The coupling member 600 includes a stud nut 610, a stud bolt 620, and a washer 630. The washer 630 may be omitted.

The stud nut 610 is forcibly inserted into the second coupling hole 200L-H to be fixed to the lower protective member 200L. The stud bolt 620 and the washer 630 coupled to the stud nut 610 restrict the movement of the upper preventing member 500-1 in the third direction DR3.

Referring to FIG. 10A, when the light guide member 300 expands, the elastic part 500-EP is contracted and the first horizontal portion 520 moves up in the second direction DR2. As shown in FIG. 10B, when the light guide member 300 contracts, the elastic part 500-EP is expanded and the first horizontal portion 520 moves down to the second direction DR2. The first coupling hole 500-H has a diameter greater than that of the second coupling hole 200L-H in order to move the first horizontal portion 520 along the second direction DR2.

During the movement of the first horizontal portion 520, the first horizontal portion 520 moves up and may make contact with the stud bolt 620 and the washer 630. The head of the stud bolt 620 and the washer 630, which have a diameter greater than that of the first coupling hole 500-H, prevent the first horizontal portion 520 from being separated.

Figure 11:
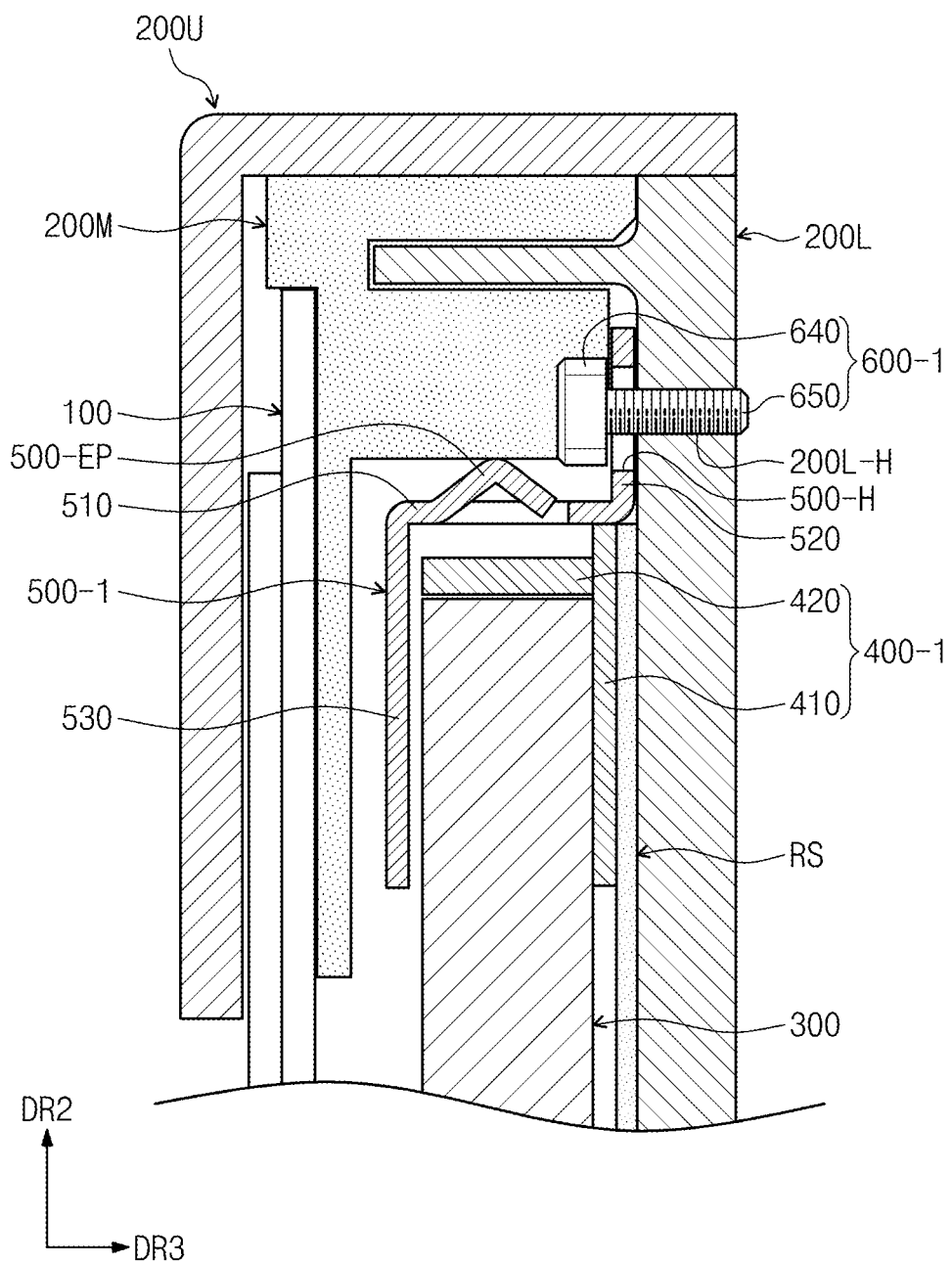
FIG. 11 is a cross-sectional view showing a part of the display device according to an exemplary embodiment of the present disclosure.

FIG. 11 is a cross-sectional view showing a part of the display device according to an example embodiment of the present disclosure.

As shown in FIG. 11, a coupling member 600-1 includes a bolt screw-coupled to the second coupling hole 200L-H. The bolt includes a head portion 640 having a diameter greater than that of the first coupling hole 500-H, and a coupling portion 650 screw-coupled to the second coupling hole 200L-H. The coupling member 600-1 may be easily assembled with the second coupling hole 200L-H, and the manufacturing cost of the display device may be reduced because the stud nut is omitted.

Figure 12:
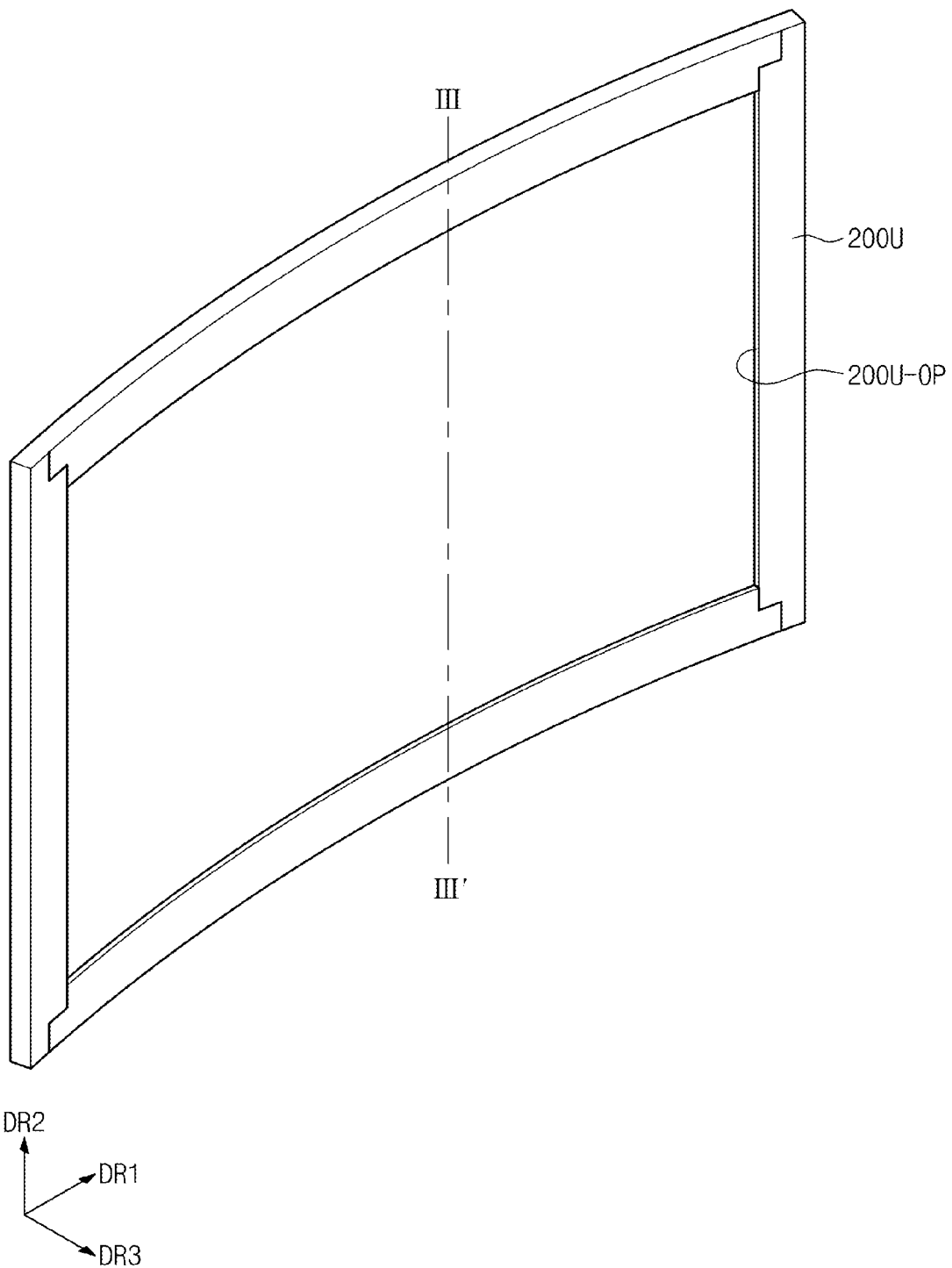
FIG. 12 is a perspective view showing a display device according to an exemplary embodiment of the present disclosure.
Figure 13:
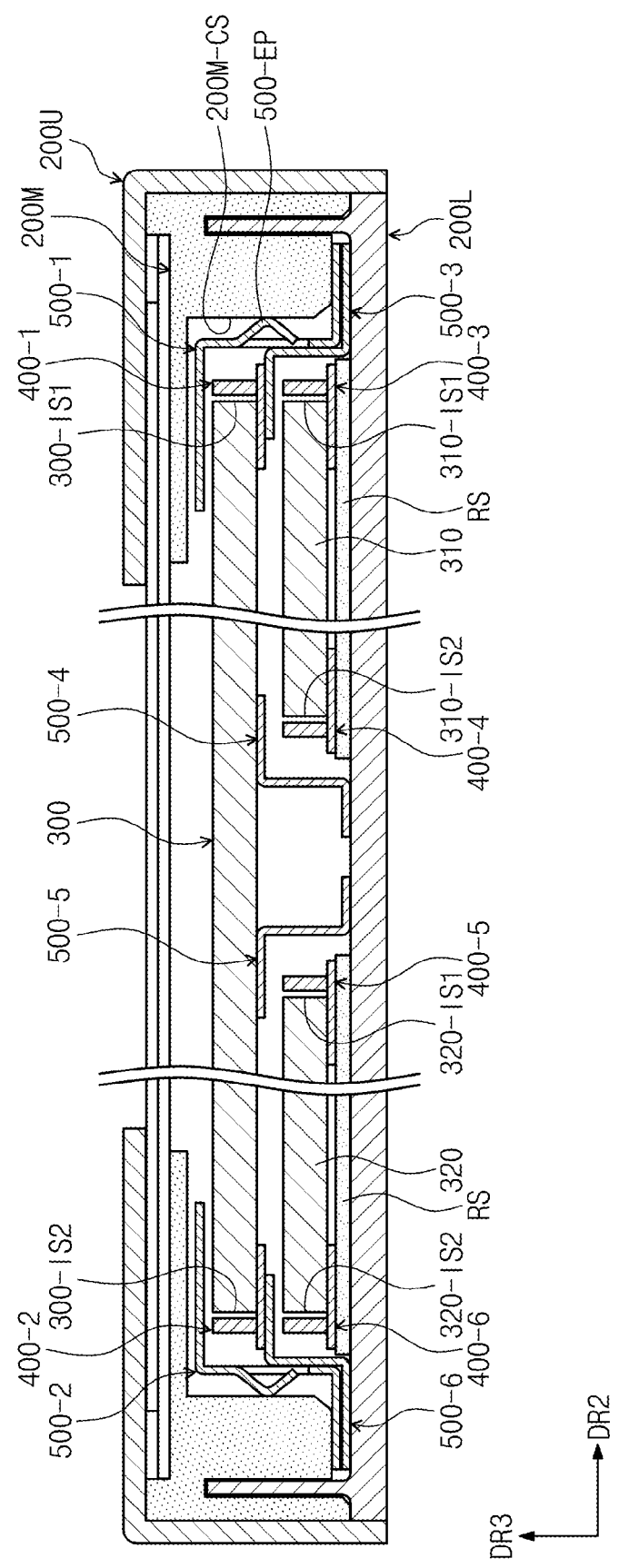
FIG. 13 is a cross-sectional view taken along a line III-III' of FIG. 12.

FIG. 12 is a perspective view showing a display device according to an example embodiment of the present disclosure and FIG. 13 is a cross-sectional view taken along a line III-III' of FIG. 12. In FIGS. 12 and 13, the same reference numerals denote the same elements in FIGS. 1 to 11, and thus detailed descriptions of the same elements will be omitted.

Referring to FIGS. 12 and 13, the display device includes a display panel 100 [The display panel needs to be labeled in FIG. 13), protective members 200U, 200M, and 200L, light guide members 300, 310, and 330, light sources 400-1, 400-2, 400-3, 400-4, 400-5, and 400-6, and light leakage preventing members (hereinafter, referred to as preventing members) 500-1, 500-2, 500-3, 500-4, 500-5, and 500-6.

The light guide members 300, 310, and 320 include a first light guide member 300 disposed under the display panel 100, a second light guide member 310 disposed under the first light guide member 310, and a third light guide member 320 disposed under the first light guide member 310. The second and third light guide members 310 and 320 have a length shorter than that of the first light guide member 300 in the second direction DR2. The second and third light guide members 310 and 320 are arranged in the second direction DR2 so as to be spaced apart from each other.

The first light guide member 300 includes the upper incident surface 300-IS1 and the lower incident surface 300-IS2. The second light guide member 310 includes an upper incident surface 310-IS1 and a lower incident surface 310-IS2, and the third light guide member 320 includes an upper incident surface 320-IS1 and a lower incident surface 320-IS2.

The light sources 400-1, 400-2, 400-3, 400-4, 400-5, and 400-6 include first and second light sources 400-1 and 400-2 respectively supplying the light to the upper and lower incident surfaces 300-IS1 and 300-IS2 of the first light guide member 300, third and fourth light sources 400-3 and 400-4 respectively supplying the light to the upper and lower incident surfaces 310-IS1 and 320-IS2 of the second light guide member 310, and fifth and sixth light sources 400-5 and 400-6 respectively supplying the light to the upper and lower incident surfaces 320-IS1 and 320-IS2 of the third light guide member 320. Each of the second and third light guide members 310 and 320 supplies the light incident thereto to the first light guide member 300.

The preventing members 500-1, 500-2, 500-3, 500-4, 500-5, and 500-6 include first and second preventing members 500-1 and 500-2 having a portion facing the first and second light sources 400-1 and 400-2, respectively, third and fourth preventing members 500-3 and 500-4 having a portion facing the third and fourth light sources 400-3 and 400-4, respectively, and fifth and sixth preventing members 500-5 and 500-6 having a portion facing the fifth and sixth light sources 400-5 and 400-6, respectively.

The first to sixth preventing members 500-1, 500-2, 500-3, 500-4, 500-5, and 500-6 may have the same shape as that of the preventing member described with reference to FIGS. 3 to 7, but the third to sixth preventing members 500-3, 500-4, 500-5, and 500-6 may not include the elastic part 500-EP.

The second light guide member 310, the third light guide member 320, the third light source 400-3, the fourth light source 400-4, the fifth light source 400-5, and the sixth light source 400-6 are disposed on the lower protective member 200L. The third and fourth preventing members 500-3 and 500-4 cover the third and fourth light sources 400-3 and 400-4, respectively, and the fifth and sixth preventing members 500-5 and 500-6 cover the fifth and sixth light sources 400-5 and 400-6, respectively. The arrangement of the third, fourth, fifth, and sixth light sources 400-3, 400-4, 400-5, and 400-6 with respect to the second and third light guide members 310 and 320 is the same as that of the upper and lower light sources 400-1 and 400-2 with respect to the light guide member 300 described with reference to FIGS. 1 to 11.

Figure 14:
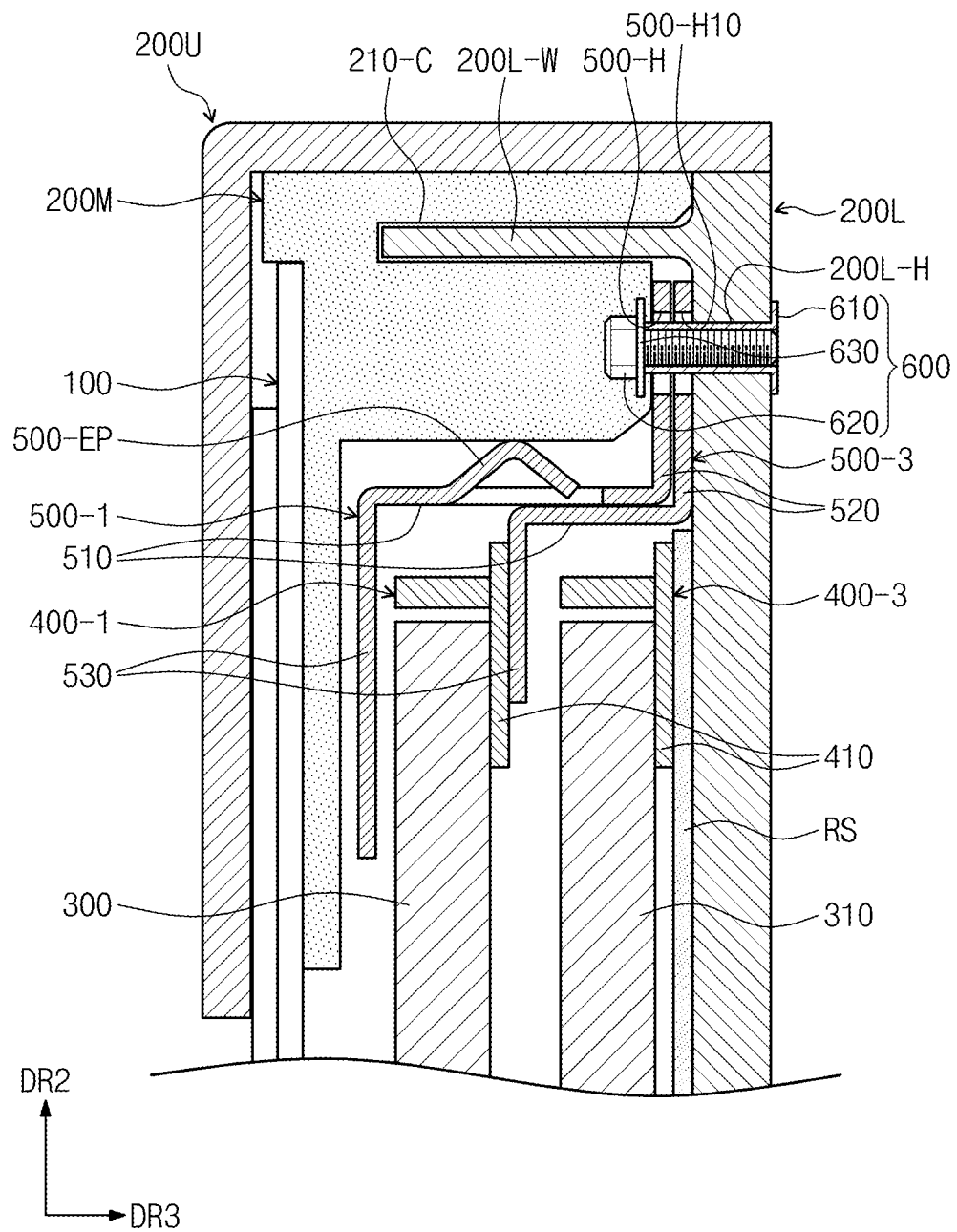
FIG. 14 is a cross-sectional view showing a part of the display device shown in FIG. 12.

FIG. 14 is a cross-sectional view showing a part of the display device shown in FIG. 12. Hereinafter, function, structure, and relation of the first preventing member 500-1, the third preventing member 500-3, and the parts adjacent to the first and third preventing members 500-1 and 500-3 will be described in detail. The following descriptions may be applied to the second preventing member 500-2, the sixth preventing member 500-6, and the parts adjacent to the second and sixth preventing members 500-2 and 500-6.

Referring to FIG. 14, the circuit board 410 of the first light source 400-1 is disposed on the second horizontal portion 530 of the third preventing member 500-3 and the circuit board 410 of the first light source 400-1 is fixed to the second horizontal portion 530 of the third preventing member 500-3 using an adhesive.

The first light guide member 300 is disposed to overlap with the circuit board 410 of the first light source 400-1. The first preventing member 500-1 is disposed to overlap with the third preventing member 500-3. The first horizontal portion 520 of the first preventing member 500-1 makes contact with the first horizontal portion 520 of the third preventing member 500-3. A portion of the vertical portion 510 of the first preventing member 500-1 makes contact with the vertical portion 510 of the third preventing member 500-3. The vertical portion 510 of the first preventing member 500-1 has a length longer than that of the vertical portion 510 of the third preventing member 500-3 in the third direction DR3.

When the first and second light guide members 300 and 310 expand, the circuit boards 410 of the first and third light sources 400-1 and 400-3 apply the lateral pressure to the first and third preventing members 500-1 and 500-3. The elastic part 500-EP of the first preventing member 500-1 is contracted to correspond to the expansion rate of the first and second light guide members 300 and 310, and thus the lateral pressure is absorbed by the elastic part 500-EP. When the first and second light guide members 300 and 310 contract, the elastic part 500-EP is expanded to correspond to a contraction rate of the first and second light guide members 300 and 310.

The first horizontal portion 520 of the first preventing member 500-1 includes the first coupling hole 500-H. The lower protective member 200L includes the second coupling hole 200L-H provided to overlap with the first horizontal portion 520. The first coupling hole 500-H and the second coupling hole 200-H are overlapped with each other.

The first horizontal portion 520 of the third preventing member 500-3 includes a coupling hole (hereinafter, referred to as third coupling hole) 500-H10 overlapped with the first coupling hole 500-H and the second coupling hole 200L-H. The third coupling hole 500-H10 has a diameter greater than that of the second coupling hole 200L-H and equal to that of the first coupling hole 500-H.

The first preventing member 500-1 and the third preventing member 500-H10 are fixed to the lower protective member 200L by the coupling member 600 inserted into the first coupling hole 500-H, the second coupling hole 200L-H, and the third coupling hole 500-H10.

Although the example embodiments have been described, it is understood that the present invention should not be limited to these example embodiments but various changes and modifications can be made by one ordinary skilled in the art within the spirit and scope of the present disclosure including the following claims.

What is claimed is:

1. A display device comprising:
   a display panel that includes a display surface concavely curved along a first direction;
   a lower protective member that accommodates the display panel;
   an upper protective member that partially covers the display panel and includes an opening portion to partially expose the display surface;
   a first light guide member disposed under the display panel and including a first incident surface and configured to guide a light incident to the first incident surface to the display panel;
   an intermediate protective member that supports the display panel and includes a contact surface facing the first incident surface;
   a first light source generating the light incident to the first incident surface and having a portion disposed between the contact surface and the first incident surface; and
   a first light leakage preventing member coupled to the lower protective member to be movable in a second direction substantially perpendicular to the first direction according to expansion or contraction of the first light guide member, having a first portion disposed between the contact surface and the portion of the first light source, and an elastic part protruded from the first portion of the first light leakage preventing member to the contact surface.

2. The display device of claim 1, wherein the first light leakage preventing member further comprises:
   a first horizontal portion bent from one end of the first portion and coupled to the lower protective member; and
   a second horizontal portion bent from the other end of the first portion and overlapped with the first light guide member.

3. The display device of claim 2, wherein the elastic part is defined by cutting a portion of the first portion.

4. The display device of claim 2, further comprising a coupling member, wherein the lower protective member comprises a first coupling hole overlapped with the first horizontal portion, the first horizontal portion comprises a second coupling hole overlapped with the first coupling hole, and the coupling member is inserted into the first coupling hole and the second coupling hole.

5. The display device of claim 4, wherein the second coupling hole has a diameter greater than a diameter of the first coupling hole.

6. The display device of claim 5, wherein the coupling member comprises:
   a stud nut fixed to the first coupling hole; and
   a stud bolt coupled to the stud nut.

7. The display device of claim 5, wherein the coupling member is a bolt screw-coupled to the first coupling hole.

8. The display device of claim 5, further comprising:
   at least one second light guide member disposed between the first light guide member and the lower protective member, including a second incident surface, and guiding a light incident to the second incident surface to the first light guide member;
   a second light source generating the light incident to the second incident surface and having a portion disposed between the contact surface and the second incident surface; and
   a second light leakage preventing member supporting the first light guide member and the first light source, and having a portion disposed between the contact surface and the first portion.

9. The display device of claim 8, wherein the second light leakage preventing member comprises:
   a second portion disposed between the contact surface and the first portion;
   a third horizontal portion bent from one end of the second portion and disposed between the first portion and the lower protective member; and
   a fourth horizontal portion bent from the other end of the second portion and supporting the first light guide member and the first light source.

10. The display device of claim 9, wherein the third horizontal portion comprises a third coupling hole overlapped with the second coupling hole.

11. The display device of claim 10, wherein the third coupling hole has a diameter equal to the diameter of the second coupling hole.

12. The display device of claim 9, wherein the first light source is disposed on the fourth horizontal portion.

13. The display device of claim 8, wherein the second light guide member comprises an upper light guide member and a lower guide member disposed to be spaced apart from the upper light guide member in the second direction, and the second light source comprises an upper light source to generate a light incident to a second incident surface of the upper light guide member and a lower light source to generate a light incident to a second incident surface of the lower light guide member.

14. The display device of claim 2, wherein the first light source comprises:
   a plurality of light emitting devices disposed between the contact surface and the first incident surface and arranged along the first direction; and
   a circuit board on which the light emitting devices are mounted.

15. The display device of claim 14, wherein the light emitting devices respectively comprise exit surfaces perpendicular to the circuit board, the incident light exits through the exit surfaces, and a portion of the circuit board is disposed between the lower protective member and the first light guide member.

16. The display device of claim 1, wherein the intermediate protective member comprises:
   a body portion that includes the contact surface and is coupled to the lower protective member; and
   a support portion coupled to the body portion to support the display panel.

17. The display device of claim 16, wherein the body portion of the intermediate protective member comprises a coupling recess and the lower protective member comprises a bottom portion and a sidewall portion inserted into the coupling recess.

18. The display device of claim 1, wherein the lower protective member, the upper protective member, the first light guide member, the intermediate protective member, the first light source, and the first light leakage preventing member have a same curvature as a curvature of the display panel and are concavely curved in the first direction.

* * * * *